United States Patent
Hosier et al.

(10) Patent No.: US 6,683,646 B2
(45) Date of Patent: *Jan. 27, 2004

(54) CMOS IMAGE SENSOR ARRAY HAVING CHARGE SPILLOVER PROTECTION FOR PHOTODIODES

(75) Inventors: Paul A. Hosier, Rochester, NY (US); Scott L. Tewinkle, Ontario, NY (US); Jagdish C. Tandon, Fairport, NY (US)

(73) Assignee: Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 229 days.

(21) Appl. No.: 08/976,474

(22) Filed: Nov. 24, 1997

(65) Prior Publication Data

US 2001/0006402 A1 Jul. 5, 2001

(51) Int. Cl.[7] ................................................. H04N 3/14
(52) U.S. Cl. ....................................... 348/302; 348/308
(58) Field of Search ................................. 348/272, 302, 348/303, 307, 308, 311, 314; 257/440, 445, 229, 230

(56) References Cited

U.S. PATENT DOCUMENTS

| | | | | |
|---|---|---|---|---|
| 4,233,632 A | * | 11/1980 | Akiyama | 348/308 |
| 4,267,469 A | * | 5/1981 | Ohba et al. | 257/229 |
| 4,302,779 A | * | 11/1981 | Inoue | 257/230 |
| 4,373,167 A | * | 2/1983 | Yamada | 257/230 |
| 4,498,013 A | * | 2/1985 | Kuroda et al. | 257/230 |
| 4,500,924 A | | 2/1985 | Ohta | 358/213 |
| 4,667,392 A | | 5/1987 | Hine et al. | 29/572 |
| 4,758,741 A | | 7/1988 | Arques | 307/311 |
| 4,833,515 A | * | 5/1989 | Baker | 257/229 |
| 5,081,536 A | | 1/1992 | Tandon et al. | 358/213.31 |
| 5,105,277 A | | 4/1992 | Hayes et al. | 358/213.31 |
| 5,148,268 A | | 9/1992 | Tandon et al. | 358/41 |
| 5,291,044 A | | 3/1994 | Gaboury et al. | 257/230 |
| 5,455,443 A | * | 10/1995 | Maki et al. | 257/230 |
| 5,471,245 A | | 11/1995 | Cooper et al. | 348/302 |
| 5,519,514 A | * | 5/1996 | TeWinkle | 358/514 |
| 5,614,744 A | | 3/1997 | Merrill | 257/291 |

FOREIGN PATENT DOCUMENTS

| | | |
|---|---|---|
| JP | A-57181155 | 11/1982 |
| JP | A-07284024 | 10/1995 |

* cited by examiner

*Primary Examiner*—Wendy R. Garber
(74) *Attorney, Agent, or Firm*—R. Hutter

(57) ABSTRACT

A CMOS-based photosensor array, having a plurality of photodiodes therein, includes a spillover protection circuit associated with each photodiode. The spillover protection circuit causes a potential to be applied to a photodiode in response to a charge spillover or "blooming" condition. The spillover protection device is momentarily disabled whenever a bias charge is injected onto the photodiode by the transfer circuit. Also, a reference voltage applied to the gate of a transistor forming the spillover protection device is higher than a threshold voltage of the transistor but is lower than a sum of the threshold voltage and a maximum light-intensity signal from the photodiode.

6 Claims, 4 Drawing Sheets

CMOS IMAGE SENSOR ARRAY HAVING CHARGE SPILLOVER PROTECTION FOR PHOTODIODES

INCORPORATION BY REFERENCE

The following U.S. patent applications, all assigned to the assignee hereof, are hereby incorporated by reference: U.S. Pat. Nos. 5,081,536; 5,105,277; and 5,148,268.

FIELD OF THE INVENTION

The present invention relates to image sensor devices, such as used in, for example, digital cameras or document scanning devices, and in particular to apparatus having an array of photodiodes outputting to an output line through CMOS circuitry.

BACKGROUND OF THE INVENTION

Image sensor arrays, such as found in digital document scanners and digital cameras, typically comprise a linear array of photosites which raster scan a focused image, or an image bearing document, and convert the set of microscopic image areas viewed by each photosite to image signal charges. Following an integration period the image signal charges are amplified and transferred to a common output line or bus through successively actuated multiplexing transistors.

Currently there are two generally accepted basic technologies for creating such linear arrays of photosites: Charge-coupled devices, or CCD's, and CMOS. In CMOS, the photosenors are in the form of photodiodes, which output a charge in response to light impinging thereon. In the scanning process, bias and reset charges are applied in a predetermined time sequence during each scan cycle. Certain prior art patents, such as U.S. Pat. No. 5,081,536 assigned to the assignee hereof, disclose two-stage transfer circuits for transferring image signal charges from the photosites in CMOS image sensors.

One concern in CMOS-type image sensor arrays is that the photodiodes are constantly outputting charge as long as light is impinging thereon. In, for example, a full-color array, where there are three distinct arrays of photodiodes, each array of photodiodes being separately associated with a translucent filter thereon, signals are read out from the different primary-color arrays in a sequence, and for long portions of the duty cycle of reading out signals, the photodiodes associated with a color which is not being read out at a particular time will be generating charge therein, this charge not ultimately being associated with any usable signal. Thus, full-color CMOS-type image sensor arrays run a risk of an unwanted accumulation of charge in the photodiodes thereof. This accumulation of charge in the photodiodes can ultimately result in "blooming", which is the spread of excess charge caused by the exposure of light leaking from one photodiode to neighboring photodiodes. If the excess charge leaks onto adjacent photodiodes in the same primary-color-filtered array, one type of artifact will result in the scanned image, and if charge from one primary-color-filtered photodiode leaks into the photodiode associated with another primary color, serious distortions in the color separation signals output from the array will result (such as, for example, when an excess of charge in a red-filtered photodiode spills into a blue-filtered photodiode). There therefore exists a need for avoiding accumulation of excess charge in photodiodes in a CMOS image sensor array.

DESCRIPTION OF THE PRIOR ART

U.S. Pat. No. 5,614,744 discloses a CMOS-based image sensor which uses guard rings and/or protective diffusions to prevent electrons generated at the periphery of an active area from impacting upon the image sensor array.

U.S. Pat. No. 5,471,245 discloses an image array in which each photosensor is associated with a column sense line and one column clamp transistor. A source of the photosensor is coupled to the column sense line, and a source of the column clamp transistor is coupled to the photosensor source.

U.S. Pat. No. 5,291,044 discloses a CCD image sensor in which storage of electrons in a photodiode junction region of the sensor is eliminated by removing an anti-blooming barrier and allowing charge to flow from the sensor's photodiode junctions into an overflow region.

U.S. Pat. No. 5,148,268 discloses a multiplexing arrangement for a color-enabled CMOS-type image sensor array. Three photodiodes per cell, each photodiode being filtered with a translucent filter to accept light of one primary color, are connected via a common node to a two-stage transfer circuit. A clocking scheme is applied to the transfer circuit to enable multiplexing of different primary-color signals from the photosensors to the output line.

U.S. Pat. No. 5,105,277 represents an improvement to the '536 patent, in which split clock transistor actuating pulses are applied to the transfer circuit, to cancel variations among a large number of photodiodes.

U.S. Pat. No. 5,081,536 discloses the basic architecture of a transfer circuit which injects a bias charge onto a photodiode in a CMOS-based image sensor array.

U.S. Pat. No. 4,758,741 discloses a solid-state imaging device in which each photosensor includes a detector which imposes a given surface potential. In case of over illumination of the detector, the detector is biased at its open circuit voltage and supplies no further current until the surface potential of the photosensor reaches a given surface potential, which produces an anti-blooming effect.

U.S. Pat. No. 4,667,392 discloses a solid-state image sensor including a plurality of nMOS transistors, each transistor separated by a field insulating film, and also separated from the silicon substrate with a buried insulating film. The buried insulating film suppresses cross talk among adjacent transistors.

U.S. Pat. No. 4,500,924 discloses a solid-state imager in which a photodiode is associated with a non-photosensitive second photodiode. A blooming suppression pulse is supplied to both diodes simultaneously with a read pulse, which as the effect of enlarging a dynamic range of the imaging apparatus.

U.S. Pat. No. 4,267,469 discloses a two-dimensional solid-state imaging device wherein a plurality of photodiodes are arranged in rows and columns, each addressable by a row and column line. In this arrangement, an anti-blooming signal can be applied selectively to rows of photodiodes through the same line in which a neighboring line of photodiodes are reset.

SUMMARY OF THE INVENTION

According to one aspect of the present invention, there is provided a photosensitive apparatus, comprising a photodiode and a transfer circuit for transferring a signal from the photodiode to an output line. A spillover protection device applies a potential to the photodiode in response to a spillover condition in which a charge on the photodiode exceeds a predetermined threshold. Clocking means cause the transfer circuit to periodically inject a predetermined bias charge on the photodiode. The clocking means further cause the spillover protection circuit to be disabled while the predetermined bias charge is injected on the photodiode.

According to another aspect of the present invention, there is provided a method of operating a photosensitive apparatus comprising a photodiode and a spillover protection device for applying a potential to the photodiode in response to a spillover condition in which a charge on the photodiode exceeds a predetermined threshold. A predetermined bias charge is injected on the photodiode and the spillover protection device is disabled while the predetermined bias charge is injected on the photodiode.

According to another aspect of the present invention, there is provided a photosensitive apparatus, comprising a photodiode and a transfer circuit for transferring a signal from the photodiode to an output line. A transistor having a gate, a source, and a drain is provided, the source of the transistor being connected to a node between the photodiode and the transfer circuit, the drain being connected to the gate and the gate is connectable to a reference voltage. A reference circuit outputs a reference voltage to the gate, the reference circuit outputting a reference voltage which is higher than a threshold voltage associated with the transistor and which is lower than the sum of the threshold voltage associated with the transistor and a voltage which corresponds to a maximum signal from the photodiode to the transfer circuit.

DETAILED DESCRIPTION OF THE INVENTION

In the following description, certain conventions will be used. In the following schematic diagrams and timing diagrams, the same index will apply both to an indicated circuit element in the schematic and to the potential or other signal in the timing diagram associated with the indicated circuit element.

Figure 1:
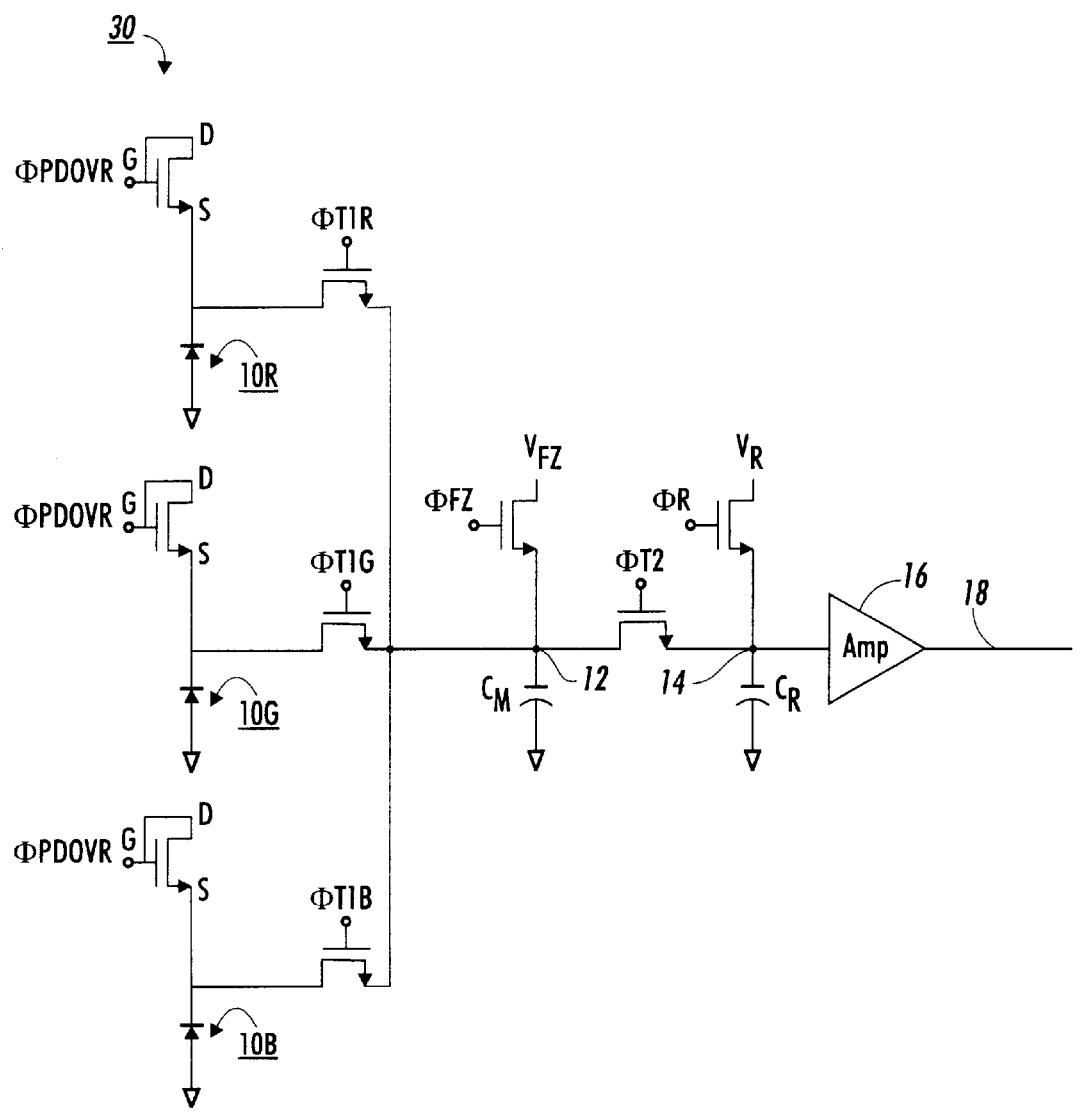
FIG. 1 is a schematic diagram showing a photodiode with associated transfer circuit and spillover protection circuit, according to the present invention.

FIG. 1 is a schematic diagram of a single photosenor "cell." A large number of cells (such as several hundred) are typically used in a full-color document scanner. The cell includes at least one photodiode, indicated as 10, and an associated transfer circuit. This transfer circuit includes all of the various gates shown in the Figure, and in particular, a middle node 12, reset node 14, amplifier 16, and an output line 18, which will ultimately connect to image-processing circuitry, during a read out by a shift register (not shown). The node capacitances such as marked as $C_M$ and $C_R$ can be purely parasitic, or can include discrete circuit elements. The overall function of the transfer circuit is described in detail in, for example, U.S. Pat. No. 5,105,277, incorporated by reference above.

In a full-color scanning apparatus, each of three photodiodes such as 10R, 10G 10B, each with a gate T1R, T1G, T1B, is commonly connected to middle node 12. Each of the three such photodiodes 10R, 10G, 10B is specifically filtered (such as with a translucent polyimide filter, not shown) to accept light of one primary color, red (R), green (G), or blue (B). The overall function of such a full-color cell having three photodiodes associated therewith is described in U.S. Pat. No. 5,148,268, incorporated by reference above.

Although the preferred operation of the transfer circuit is given in detail in the patent incorporated by reference, basically, the middle node 12 serves as a location in which a "fat zero" bias charge injection, such as indicated as $V_{FZ}$ in the Figure, can be injected onto a photodiode 10. As described in the patents incorporated by reference, the purpose of this bias charge injection is to cause the photodiode to output a signal in a linear range. Downstream of the middle node 12, the reset node 14 and its associated circuitry allows a reset voltage $V_R$ to be placed on the transfer circuit, $V_R$ being of such a magnitude as to draw a signal from the photodiode 10 through the transfer circuit, ultimately through amplifier 16 and onto output line 18.

Figure 2:
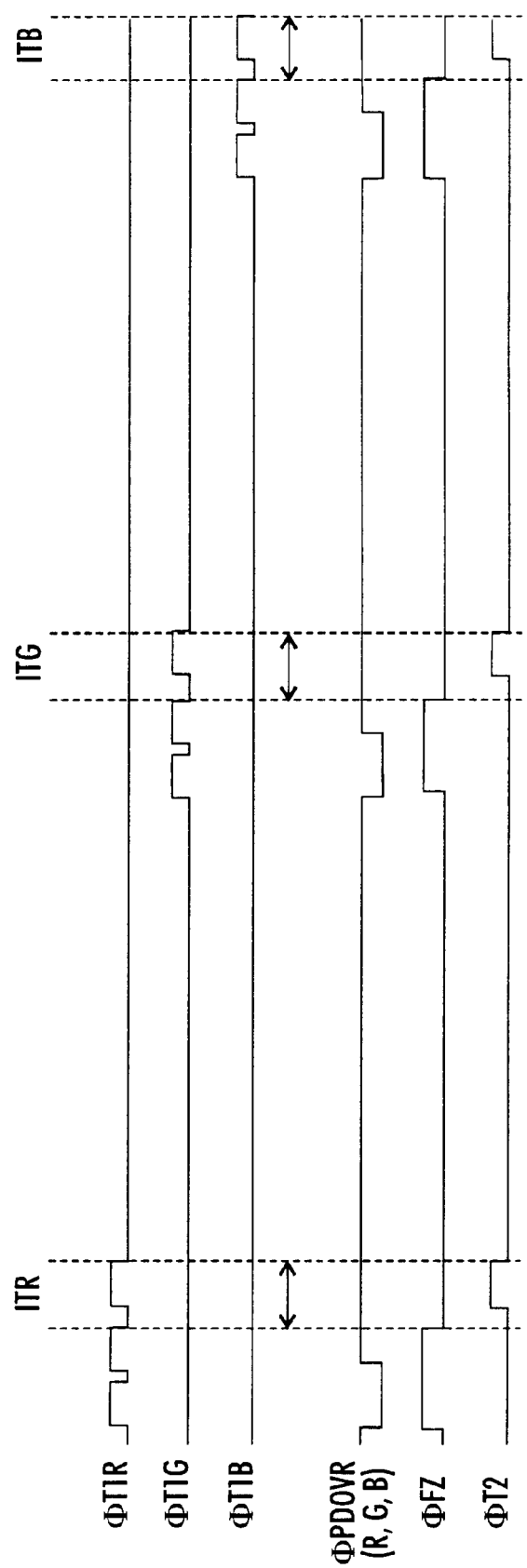
FIG. 2 is a timing diagram showing one possible operation of the circuit shown in FIG. 1.
Figure 3:
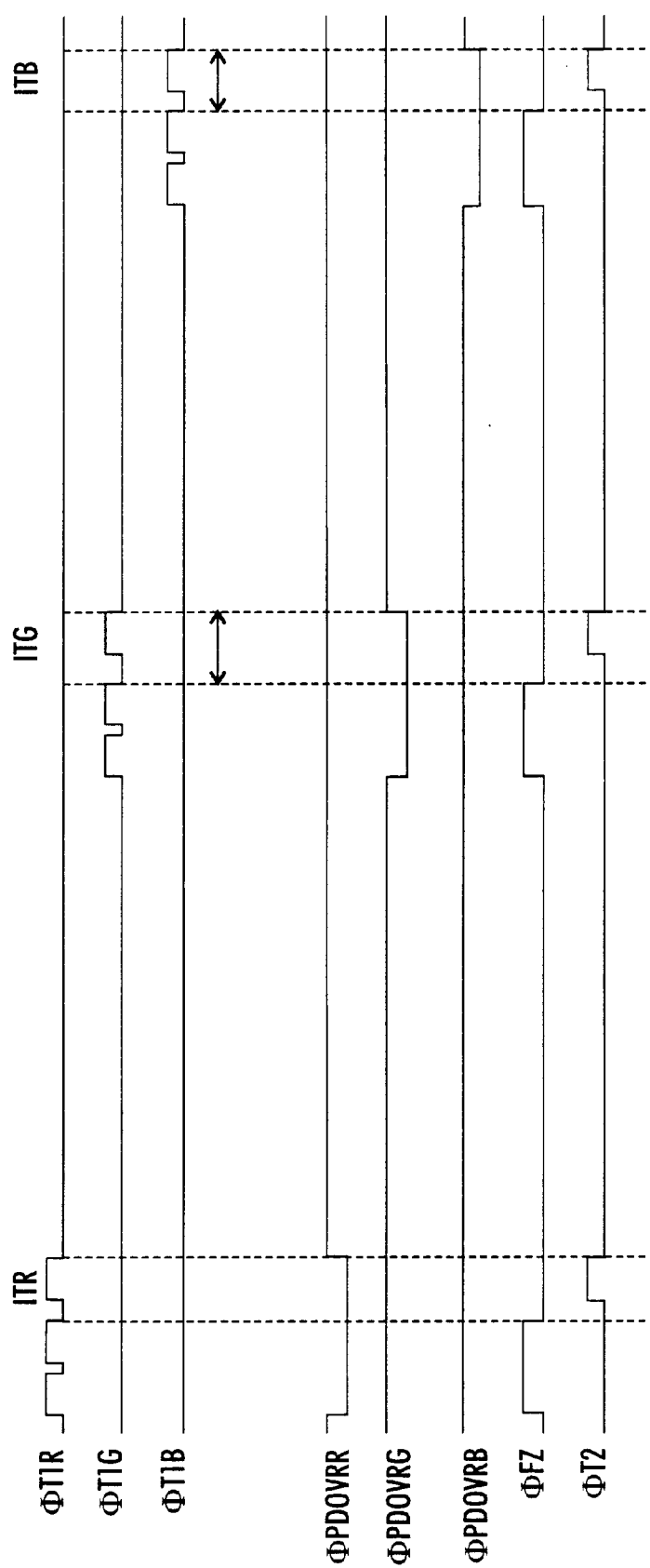
FIG. 3 is a timing diagram showing another possible method of operation of the circuit shown in FIG. 1.

The clocking of various signals at predetermined times (such as shown in FIG. 2 or 3) is carried out by a clocking means (not shown) ultimately connected to each contact in FIG. 1, the essential nature of which is known in the art. Such clocking means could comprise, for example, a suitably programmed general-purpose microprocessor.

One novel addition to the transfer circuit shown in FIG. 1 is what is here called a "spillover protection device" each of which is generally indicated as 30. The spillover protection device 30 applies a potential to photodiode 10 in response to a spillover condition in which a charge on the photodiode 10 exceeds a predetermined threshold. This predetermined threshold is generally related to the spillover problem mentioned above, in which an excess of charge accumulated in a particular photodiode 10 can leak or spillover to neighboring photodiodes, such as an excess of charge in a red photodiode spilling into the blue photodiode within the same cell.

In the preferred embodiment of the present invention, the spillover protection device 30 for each photodiode 10 is in the form of a NMOS transistor, having a source, gate, and drain (indicated as S, G, and D in the Figure), with the drain connected to the gate and the source connected to a node effectively between the photodiode and the associated transfer circuit. Preferably, in the three-color cell, such a spillover protection device 30 is associated with each photodiode 10R, 10G, 10B. Further, as can be seen, the gate of the transistor is ultimately connected to a source of a reference voltage indicated as PDOVR, which is controlled by the clocking means ($\Phi_{PDOVR}$, as shown, merely indicates a clocked signal of applying PDOVR). As will be described in detail below, all or part of the "reference source" of this reference voltage PDOVR can be on the same chip as the array of photosensors and transfer circuits, or else can be made external to such a chip.

The immediate function of the transistor forming spillover protection device 30 is to clamp the potential on a photodiode 10 so that the potential does not go below a predetermined threshold; such a low potential would be caused by an accumulation of electrons on the photodiode 10 steadily decreasing the potential on the photodiode. In brief, when the spillover protection device 30 is activated, a positive charge is directed from the transistor to the photodiode, thereby drawing off the excess electrons from the photodiode 10. The transistor forming spillover protection device 30 has a threshold voltage associated therewith so that when the potential difference between the gate (that is, the reference voltage PDOVR placed on the gate) and the source (that is, the photodiode) exceeds the threshold voltage of the transistor, a channel will form and current will flow from the photodiode in response to the positive potential PDOVR.

Of course, for proper operation of the transistor acting as the spillover protection device 30, the voltage PDOVR must be of a magnitude carefully selected with respect to the electrical characteristics of both the photodiode 10 and other elements in the associated transfer circuit. If PDOVR is too low, the condition in which an excess of charge in the photodiode 10 will not be addressed adequately by the application of PDOVR, and if PDOVR is too high there will be a danger of reactivation of the transistor applying PDOVR when the photodiode 10 is in fact outputting a signal. In selecting a value of PDOVR for optimal performance, the following guidelines should be used: PDOVR should be greater than the threshold voltage of the transistor, but should be less than the sum of the threshold level of the transistor and the lowest voltage on the photodiode 10 which would correspond to a maximum signal from the photodiode as part of the general design of the image sensor array. For example, if the total design of the image sensor array (such as manifest in the characteristics of the elements in the transfer circuit) is such that a maximum, full-brightness signal on the photodiode results in an output of 0.8 volts from the photodiode, the maximum voltage of PDOVR (shown as $V_{PDOVR}$) should be the threshold voltage of the transistor forming spillover protection device 30, plus 0.8 volts.

FIG. 2 is a diagram showing the clocking scheme for the various circuit elements shown in FIG. 1, according to one method of the present invention. As can be seen, the operation of the gate shown as T1 in FIG. 1 is divided in FIG. 2 into three separate waveforms T1R, T1G, and T1B, indicating that the different primary-color photodiodes 10R, 10G, and 10B operate in a multiplexed fashion. Once again, details of the operation of such a transfer circuit are given in general in U.S. Pat. No. 5,148,268. What is significant in FIG. 2 is that the fat zero injection, indicated as FZ, which causes the injection of an initial bias charge on a particular photodiode 10, which is shown in FIG. 2 by FZ momentarily going high while one or another gate T1R, T1G, or T1B simultaneously goes high in a split-clock pulse, is always accompanied by a momentary drop in PDOVR.

The purpose of the fat zero injection on each photodiode is to clear the photodiode with a known zero point charge. To simultaneously cause the application of PDOVR during the fat zero injection would probably result in the misapplication of too much charge on the photodiode 10. Thus, while PDOVR can be almost constantly applied to the gate of the transistor forming spillover protection device 30, the spillover protection device 30 should be momentarily disabled (i.e., by dropping PDOVR low or stopping completely) so as not to interfere with the necessary injection of a bias charge onto the photodiode as part of the read out process.

As can be seen in FIG. 2, the time periods ITB, ITG, and ITR represent the integration periods of the blue, green, and red photodiodes respectively. As described, for instance, in the patents incorporated by reference, the integration period of a photodiode is the length of time in which light impinging on the photodiode is collected, or integrated, to result in a useable light signal. Outside the integration times, i.e., in an "inactive" period in a cycle of operation, any charge which is induced on any photodiode is not used in any subsequent image signal, but would be flushed out during the reset process as described in the patents incorporated by reference. Significantly, as shown in the Figure, for each photodiode the charge PDOVR is momentarily dropped, meaning the associated spillover protection device 30 is momentarily disabled, during the inactive period, so that the fat zero bias FZ can be placed on the photodiode.

In the scheme of FIG. 2, it will be noted that the momentary drop in PDOVR is common to all three photodiodes so that, even if only the red photodiode 10R is being injected with a bias charge (such as with the simultaneous application of a pulse to T1R and the momentary drop in PDOVR), the PDOVR is being dropped for the other photodiodes (green and blue) as well. Although it is simpler to commonly control all of the PDOVR drops for all three photodiodes in a cell simultaneously, it may also be desirable to control the momentary drops in PDOVR independently, so that when PDOVR for the red photodiode is dropped during the bias charge injection, PDOVR stays high for the green and blue photodiodes.

FIG. 3 is another timing diagram showing an alternate method according to the present invention where, as can be seen, three distinct waveforms PDOVRR, PDOVRG, and PDOVRB, show the drops in PDOVR for each color-filtered photodiode occurring independently of the other colors. With this arrangement, the spillover protection afforded by the application of PDOVR can be maintained for a particular primary-color photodiode even when another primary-color photodiode is being injected with bias charge.

Figure 4:
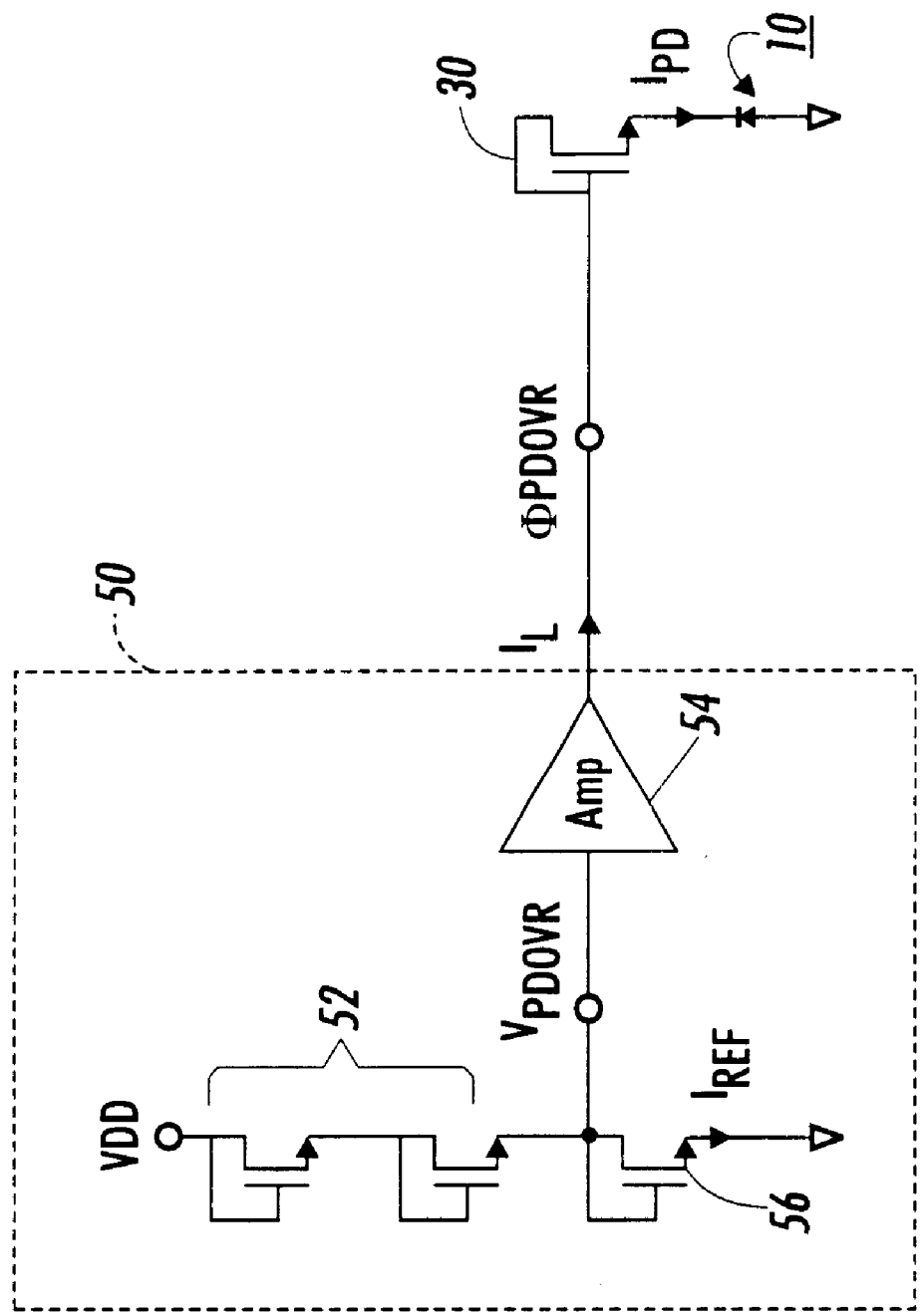
FIG. 4 is a simplified schematic diagram showing a circuit for generating a reference voltage to be applied to the spillover protection circuit of the present invention.

As mentioned above, the ultimate source of the reference voltage $V_{PDOVR}$ supplied to the various spillover protection devices associated with the large plurality of photodiodes may exist on the same chip as the photodiodes themselves, or alternately could exist external to such a chip. FIG. 4 is a simplified schematic diagram showing some essential elements of what is herecalled a "reference circuit," indicated as 50, which outputs a reference voltage for use by the spillover protection circuit, in this case outputting the reference $V_{PDOVR}$ to the various gates of the transistors forming the various spillover protection devices in an image sensor array. The reference circuit 50 includes, among other possible elements, an input for a source of original voltage VDD, this original voltage VDD passing through any number of clamping transistors 52 in order to be generally adjusted to the desired level of $V_{PDOVR}$. Further, the output of $V_{PDOVR}$ is preferably buffered through a unity-gain amplifier such as 54.

According to one specific aspect of the present invention, there is further provided within reference circuit 50 what is called a "threshold tracking" transistor indicated as 56. This threshold tracking transistor 56 is preferably disposed with the drain and gate thereof connected to the output of $V_{PDOVR}$, as shown, and the source thereof connected directly to ground. It will be noted that the overall configuration of threshold tracking transistor 56 is identical to the configuration of any transistor associated with a photodiode as a transistor forming the spillover protection device 30 associated with any photodiode 10 in the array. (Of course, in a practical system, a single reference circuit 50 will be ultimately associated with a large plurality of such spillover protection devices 30.) The only difference between the configuration of threshold tracking transistor 56 and the transistor in spillover protection device 30 is that the spillover protection device 30 includes a photodiode 10 disposed between the source thereof and ground.

The purpose of tracking transistor 56 is to provide an element which emulates any long-term changes in behavior of a transistor such as in spillover protection device 30. Preferably, tracking transistor 56 should be formed in the same chip substrate as the transistor in spillover protection device 30, and should more preferably have the same electronic characteristics, and even the same physical dimensions, as the transistors in the various spillover protection devices in the chip. If the transistor 56 and the transistor forming spillover protection device 30 are the same size, because of the presence of photodiode 10 associated with the transistor device 30, the current in transistor 56 should be designed to be larger than the current in transistor 30 under all conditions of light. This will in turn prevent the photodiode 10 from becoming forward biased and allowing charge to spillover into adjacent photodiodes.

While the invention has been described with reference to the structure disclosed, it is not confined to the details set forth, but is intended to cover such modifications or changes as may come within the scope of the following claims.

What is claimed is:

1. A photosensitive apparatus, comprising:

a photodiode;

a transfer circuit associated with the photodiode, for transferring a signal from the photodiode to an output line; and a spillover protection device, independently controllable relative to the transfer circuit, for applying a potential to the photodiode in response to a spillover condition in which a charge on the photodiode exceeds a predetermined threshold; and clocking means for providing, within each cycle of operation, an integration period in which charge generated by the photodiode is integrated to yield a signal related to light impinging on the photodiode, and an inactive period wherein light impinging on the photodiode is not integrated to yield a signal, and causing the transfer circuit to periodically inject a predetermined bias charge on the photodiode during the inactive period of each cycle of operation, the clocking means further disabling the spillover protection device while the predetermined bias charge is injected on the photodiode.

2. The apparatus of claim 1, the spillover protection device including a transistor having a gate, a source, and a drain, the source being connected to a node between the photodiode and the transfer circuit, the drain being connected to the gate, and the gate connectable to a reference voltage.

3. The apparatus of claim 1, the clocking means causing the reference voltage on the gate of the transistor in the spillover protection circuit to be decreased while the predetermined bias charge is injected on the photodiode.

4. A method of operating a photosensitive apparatus comprising a photodiode and a spillover protection device for applying a potential to the photodiode in response to a spillover condition in which a charge on the photodiode exceeds a predetermined threshold, the method comprising the steps of:

providing, within each cycle of operation, an integration period in which charge generated by the photodiode is integrated to yield a signal related to light impinging on the photodiode, and an inactive period wherein light impinging on the photodiode is not integrated to yield a signal;

injecting a predetermined bias charge on the photodiode during the inactive period of each cycle of operation; and disabling the spillover protection device while the predetermined bias charge is injected on the photodiode.

5. The method of claim 4, wherein the spillover protection device includes a transistor having a gate, a source, and a drain, the source being connected to a node between the photodiode and the transfer circuit, the drain being connected to the gate, and the gate connectable to a reference voltage, the disabling step including decreasing the reference voltage applied to the gate.

6. The method of claim 4, wherein the spillover protection device includes a transistor having a gate, a source, and a drain, the source being connected to a node between the photodiode and the transfer circuit, the drain being connected to the gate, and the gate connectable to a reference voltage, the reference voltage being higher than a threshold voltage associated with the transistor in the spillover protection device, and lower than a sum of the threshold voltage associated with the transistor in the spillover protection circuit and a voltage which corresponds to a maximum signal from the photodiode.

* * * * *